US009293285B2

(12) United States Patent
Pullmann et al.

(10) Patent No.: US 9,293,285 B2
(45) **Date of Patent: *Mar. 22, 2016**

(54) SAFETY CIRCUIT ARRANGEMENT FOR CONNECTION OR FAILSAFE DISCONNECTION OF A HAZARDOUS INSTALLATION

(71) Applicant: Pilz GmbH & Co. KG, Ostfildern (DE)

(72) Inventors: Juergen Pullmann, Ostfildern (DE); Christoph Zinser, Ostfildern (DE); Michael Schlecht, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 597 days.

This patent is subject to a terminal disclaimer.

(21) Appl. No.: 13/721,620

(22) Filed: Dec. 20, 2012

(65) Prior Publication Data

US 2013/0113304 A1 May 9, 2013

Related U.S. Application Data

(63) Continuation of application No. PCT/EP2011/060444, filed on Jun. 22, 2011.

(30) Foreign Application Priority Data

Jun. 25, 2010 (DE) ........................ 10 2010 025 675

(51) Int. Cl.
*H01H 47/00* (2006.01)
*H02J 1/00* (2006.01)

(52) U.S. Cl.
CPC .................................. *H01H 47/005* (2013.01)

(58) Field of Classification Search
CPC ........................................................ H01J 1/00
USPC ........................................................ 307/326
See application file for complete search history.

(56) References Cited

U.S. PATENT DOCUMENTS 5,687,192 A 11/1997 Meyer et al.
6,417,582 B1 7/2002 Dold et al.

(Continued)

FOREIGN PATENT DOCUMENTS

DE 43 33 358 A1 4/1995
DE 199 11 698 A1 9/2000

(Continued)

OTHER PUBLICATIONS

ISA/EP; English language translation of International Preliminary Report on Patentability (Chapter 1); issued by WIPO Dec. 28, 2012; 11 pp.

(Continued)

*Primary Examiner* — Robert Deberadinis
(74) *Attorney, Agent, or Firm* — Harness, Dickey & Pierce, P.L.C.

(57) ABSTRACT

A safety circuit arrangement for failsafe connection or disconnection of a hazardous installation has a control device, which is designed to connect or interrupt, in failsafe fashion, a power supply path to the installation. The safety circuit arrangement also has a signaling device, which is connected to the control device via a two-wire line having a first core and a second core. The signaling device has an actuator, which can change between a defined first state and a second state. Between the two cores is a substantially constant voltage when the actuator is in the second state. A pulse generator in the signaling device causes a voltage dip between the first core and the second core in order to generate a defined pulsed signal comprising a plurality of signal pulses on the lines, when the actuator is in the defined first state.

14 Claims, 2 Drawing Sheets

(56) References Cited

U.S. PATENT DOCUMENTS

| | | | |
|---|---|---|---|
| 6,628,015 B2 | 9/2003 | Pullmann et al. | |
| 7,130,171 B2 | 10/2006 | Pullmann et al. | |
| 7,504,747 B2 | 3/2009 | Pullmann et al. | |
| 7,562,261 B2 | 7/2009 | Meyer-Gräfe et al. | |
| 7,656,629 B2 | 2/2010 | Pullmann et al. | |
| 7,948,391 B2 | 5/2011 | Pullmann et al. | |
| 2014/0028453 A1* | 1/2014 | Schwenkel et al. ........... | 340/532 |

FOREIGN PATENT DOCUMENTS

| | | |
|---|---|---|
| DE | 100 23 199 A1 | 1/2001 |
| DE | 100 11 211 A1 | 9/2001 |
| DE | 102 16 226 A1 | 10/2003 |
| DE | 103 48 884 A1 | 5/2005 |
| DE | 10 2004 020 997 A1 | 11/2005 |
| DE | 10 2006 027 135 B3 | 9/2007 |
| EP | 1 363 306 A2 | 11/2003 |
| JP | 2007-532838 | 11/2007 |
| JP | 2008-276792 | 11/2008 |

OTHER PUBLICATIONS

CEI IEC 61508-2; Functional safety of electrical/electronic/programmable electronic safety-related systems—Part 2: Requirements for electrical/electronic/programmable electronic safety-related systems; First edition; May 2000; 152 pp.

DIN Standard EN 954-1; Safety-related parts of control systems Part 1: General principles for design; Mar. 1997; 34 pp.

* cited by examiner

SAFETY CIRCUIT ARRANGEMENT FOR CONNECTION OR FAILSAFE DISCONNECTION OF A HAZARDOUS INSTALLATION

CROSSREFERENCES TO RELATED APPLICATIONS

This application is a continuation of international patent application PCT/EP2011/060444 filed on Jun. 22, 2011 designating the U.S., which international patent application has been published in German language and claims priority from German patent application DE 10 2010 025 675.7 filed on Jun. 25, 2010. The entire contents of these prior applications are incorporated herein by reference.

BACKGROUND OF THE INVENTION

The present invention relates to a safety circuit arrangement for connection or failsafe disconnection of a hazardous installation, and to a new type of signaling device used in such a safety circuit arrangement.

A safety circuit arrangement in terms of the present invention is a circuit arrangement with at least two components, which interact so as to protect against hazardous operation of a technical installation, i.e. so as to avoid accidents which endanger the health or the life of people in the vicinity of the installation. One component is a control device (or controller), which is specifically designed to interrupt, in failsafe fashion, a power supply path to the installation in order to bring the installation into a non-hazardous, deenergized state. In the case of relatively large installations, this function of the control device can be limited to parts or regions of the installation, and different regions of a relatively large installation can be controlled separately by a plurality of control devices. It is important that the control devices ensure a safe operating state of the installation even when faults occur, for example when electronic components fail, a cable connection is damaged or another fault event occurs. Therefore, the control devices are usually constructed with multiple-channel redundancy and have internal monitoring functions in order to identify individual faults early and to avoid an accumulation of faults. Suitable control devices may be programmable safety controllers or simpler safety switching devices with a substantially predefined functional range. Typically, the control devices have single-fault safety in terms of European Standard EN 954-1 category 3 or higher, in terms of SIL 2 of International Standard IEC 61508 or in terms of comparable specifications.

The control devices monitor the operating state of so-called signaling devices or sensors. The signaling devices/sensors generate input signals for the control device, which input signals are evaluated by the control device and logically interconnected, if appropriate, in order to connect or disconnect actuators of the installation, such as an electric drive or a solenoid valve for example, depending on said signals. In many cases, the signaling devices generate very simple binary information, for example regarding whether a mechanical protective door is closed or not, whether an emergency stop button has been actuated or not, whether a light barrier has been interrupted or not. However, signaling devices/sensors may also generate analogue values, such as the temperature of a boiler or the rotational speed of a drive, for example. Generally, the control device of the safety circuit arrangement only enables operation of the installation when it can be assumed, on the basis of the signals from the signaling devices/sensors, that there is non-hazardous operation. However, there are also cases in which protective measures are intentionally overridden, for example in order to allow a machine setup operating mode while the protective door is open. In these cases, a special enable button is often used which needs to be actuated by the operator in such a case. Such an enable button is a safety-relevant signaling device.

In a large installation, there may be a plurality of signaling devices/sensors which supply safety-relevant input signals to the safety controller. The individual signaling devices/sensors can be located far away from one another, which results in considerable set-up effort. In the case of cable connections which run outside of a closed switchgear cabinet or outside of pinch-proof tubes, cross-connections which can occur as a result of damage need to be detected by the safety controller. Therefore, the connecting lines between signaling devices/sensors and control devices of a safety circuit arrangement often have redundancy, which additionally increases the complexity.

DE 10 2004 020 997 A1 discloses a safety circuit arrangement, wherein a plurality of signaling devices are connected in series to a failsafe control device. The control device generates two redundant enable signals, which are fed back to the control device via two redundant lines through the series of signaling devices. If a signaling device in the series interrupts at least one of the redundant enable signals, this is detected in the control device and the power supply path to the installation is interrupted. Due to a smart implementation of the signaling devices, it is also possible to transmit diagnosis information to the control device via said safety lines. The known circuit arrangement therefore enables a relatively inexpensive design with flexible diagnosis possibilities. However, the practical implementation requires at least four separate lines or line cores for feeding the enable signals from the control device to the signaling devices and back again. Since the signaling devices use electronic components which require an operating voltage for passing on the redundant enable signals, typically two further lines or core pairs are required for supplying the operating voltage and corresponding ground potential to the signaling devices. Such an implementation is therefore still complex, despite the already achieved advantages, in particular when it is necessary to bridge large distances between individual signaling devices and the control device. When controlling ski lifts, for example, there may be distances of several kilometers between a signaling device and the control device and in such cases it is desirable to use already existing lines, although there are generally not sufficient line cores available for an implementation according to DE 10 2004 020 997 A1.

DE 199 11 698 A1 discloses another safety circuit arrangement with a control device and a plurality of signaling devices, which are connected in series with one another to the control device. Each signaling device has a normally-closed contact and is coupled to a code signal generator, which supplies a characteristic code signal to the control device when the contact has been opened. For the practical implementation, at least three line cores are required. Nevertheless, a cross-connection between the line at the enable signal output of the control device and the line at the enable signal input of the control device cannot readily be detected, with the result that further redundant signal lines may be required for a higher safety category.

DE 100 11 211 A1 discloses a further safety circuit arrangement with signaling devices and a failsafe control device. The signaling devices are connected to the control device either in single-channel fashion via one connecting line or two-channel fashion via two redundant connecting lines. The single-channel connection does not per se provide any failsafety and is only proposed for a start button, which in such cases is typically arranged close to the hazardous installation. One exemplary embodiment describes the fact that two different clock signals are fed from the failsafe control device back to the control device via redundant contacts of an emergency stop button as enable signals.

DE 102 16 226 A1 discloses a safety circuit arrangement with a plurality of signaling devices and control devices, with the control devices being connected in series so as to form a hierarchical control system with different disconnection groups. In exemplary embodiments, the control devices are coupled via a single-channel connecting line, via which a switching signal with a static signal component and a dynamic signal component relative to a defined potential is transmitted. The embodiment further requires a common ground for the connected control devices. Moreover, each connected control device requires an operating voltage, which likewise needs to be supplied so that the actual number of lines is even higher.

DE 103 48 884 A1 discloses a signaling device with an actuating element, which can be moved between a first position and at least one second position. A detector element for detecting the position of the actuating element comprises a transponder with individual transponder identification and a read unit for the transponder identification. The signaling device has a signal input for supplying a test signal, with the aid of which the reading of the transponder identification can be suppressed for test purposes. In addition, connections for a supply voltage, ground and a signal output are required, via which the signaling device can transmit the information from the detector elements to a failsafe control device. In order to connect the signaling device to a control device, therefore, at least four lines are required in total.

A further signaling device is known from DE 100 23 199 A1. In a rest position of the signaling device, a switching element is open. In a specific actuating position, the switching element is closed. Details relating to the connection of the signaling device to a failsafe control device are not described.

In addition, a field bus system called ASI (Actuator-Sensor-Interface) bus is known to those skilled in the art, said ASI bus system can be implemented with a special two-core cable and is used for interconnecting sensors and actuators in the field plane of an automated installation. An ASI bus master in this case transmits requests to the sensors connected to the ASI bus at repeated time intervals. Said sensors then transmit their sensor state to the ASI bus master. This system requires only two line cores. However, specific interface modules which are capable of implementing the bus protocol are required. For a safety circuit arrangement of the type mentioned at the outset, both the control device and the signaling device need to have an ASI bus-compatible interface module, which is too complex and expensive for some applications.

Finally, DE 43 33 358 A1 discloses an unsafe circuit arrangement, wherein both an operating voltage and a control signal are transmitted from a control device to a solenoid valve, i.e. to an actuator, via a two-core connecting line.

SUMMARY OF THE INVENTION

Against this background, it is an object of the present invention to provide a safety circuit arrangement and a signaling device which enable a less expensive and nevertheless failsafe connection between a signaling device and a control device, in particular when the signaling device and the control device are physically far away from each other.

In accordance with a first aspect of the invention, there is provided a safety circuit arrangement for connection or failsafe disconnection of a hazardous installation, comprising a control device designed to connect or failsafely interrupt a power supply path to the installation, and comprising a signaling device connected to the control device via a two-wire line having a first and a second core, with the signaling device having an actuator configured to be moveable between a defined first state and a second state, and having a pulse generator designed to generate a defined pulsed signal with a plurality of signal pulses on the two-wire line when the actuator is in the defined first state, wherein a substantially constant voltage is present between the first and second core when the actuator is in the second state, and wherein the pulse generator is designed to effect a voltage dip between the first core and the second core in order to generate the plurality of signal pulses.

In accordance with a further aspect of the invention, there is provided a signaling device comprising a first and a second connector for connecting a two-wire line leading to a safety controller, said two-wire line having a first core and a second core, comprising an actuator moveable between a defined first state and a second state, comprising a voltage regulator designed for generating a constant operating voltage from a supply voltage provided on the first and second cores, and comprising a pulse generator designed to generate a defined pulsed signal with a plurality of signal pulses between the first core and the second core when the actuator is in the defined first state, wherein the pulse generator receives the constant operating voltage from the voltage regulator, and wherein the pulse generator is designed to effect a short circuit between the first core and the second core in order to generate the plurality of signal pulses.

The novel safety circuit arrangement and the novel signaling device therefore use (and only require) a two-wire line, via which the signaling device is connected to the control device. In comparison with known safety circuit arrangements, the number of connecting lines is therefore reduced to a minimum. A substantially constant voltage is present between the two cores of the two-wire line, said voltage being used in advantageous configurations to supply an operating voltage to the signaling device. Despite this, the pulse generator of the signaling device generates a plurality of signal pulses which form a defined pulsed signal, for example by means of a simple short circuit, between the two cores of the connecting line. In some exemplary embodiments, the pulse generator generates the voltage dip by means of a complete short circuit between the two line cores. The voltage between the two line cores is then reduced to zero. In other exemplary embodiments, an electrical resistance between the two line cores can be activated, which results in a voltage dip, but permits a residual voltage of greater than zero. For example, the voltage between the two line cores may be approximately 24 volts when the actuator is in the second state and may be reduced to approximately 5 volts when the pulse generator brings about the voltage dip.

Therefore, the signaling device generates a dynamic signal, i.e. a signal that varies over time, and it makes this dynamic signal available as input signal to the control device. In contrast to the known safety circuit arrangements, however, the novel safety circuit arrangement dispenses with a signal loop, which starts at the control device and is passed back to the control device via the signaling device. Instead, only expectations in respect of the defined pulsed signal are stored in the control device, i.e. the control device expects precisely the defined pulsed signal from the signaling device when the actuator is located in the defined first state. It is conceivable for the signaling device to be capable of generating a plurality of defined pulsed signals which differ from one another, with each of the defined pulsed signals from the set of defined pulsed signals representing the information that the actuator is in the defined first state. With the aid of different pulsed signals, the signaling device can transmit further information to the control device, it being possible for said information to be advantageously used in the control device for diagnosis of an operating situation of the installation. In an exemplary embodiment in which the actuator has a two-channel design, the differently defined pulsed signals can represent information regarding whether both actuator channels are actually in the defined first state or, if not, which actuator channel has failed, if appropriate.

Known safety circuit arrangements generally use a signal loop from the control device to the signaling device and back again. This entails the risk of a cross connection between the forward line and the return line of the signal loop, with such cross connection bridging the signaling device and erroneously suggesting a safe state to the control device. The novel safety circuit arrangement dispenses with the loop and thus avoids a potential source of error in known safety circuit arrangements. Secondly, the novel signaling device generates a dynamic signal with a plurality of signal pulses, with the result that a "stuck-at" fault in the signaling device or at the cores of the two-wire line is quickly detected. The combination of the two features makes it possible to connect the signaling device and the control device to one another in a failsafe manner via a merely two-core cable. The novel safety circuit arrangement is therefore perfectly suited for applications in which the number of available line cores is limited. However, even when more line cores are generally available, the novel safety circuit arrangement can advantageously be used since the wiring complexity between the signaling device and the control device is minimized.

On the other hand, the signaling device transmits the dynamic information signal independently to the control device, i.e. without any previous request from the control device. This is the way in which the novel safety circuit arrangement differs from bus-based systems, which generally have a bidirectional flow of information with which the control device interrogates connected signaling devices. The novelty safety circuit arrangement can therefore transmit the safety-relevant connection or disconnection information to the control device without a bidirectional communications protocol. There is no need to use special and therefore relatively expensive communications controllers in the signaling device and/or control device. Nevertheless, a bus-based communication between the control device and the signaling device can naturally be implemented in addition to the unidirectional information path described here when this is advantageous for other reasons.

Overall, the novel safety circuit arrangement and the novel signaling device therefore enable a very inexpensive and nevertheless failsafe embodiment. The abovementioned object is completely achieved.

In a preferred refinement of the invention, the control device has a signal input connector, which is electrically connected to the first core, and a ground connector, which is electrically connected to the second core.

In this refinement, the defined pulsed signal is a signal relative to a reference potential, which signal is present between the two cores in the form of voltage pulses. The second core passes the reference potential for the signal pulses to the first core. In a preferred variant of this refinement, the ground connector is electrically connected to the device ground of the control device or is even the same as the device ground. The configuration has the advantage that the novel signaling device is compatible with known control devices. The novel safety circuit arrangement can therefore be inexpensively implemented with the novel signaling device.

In a further refinement, the first core is further connected to an operating voltage source, which is arranged remote from the signaling device. Preferably, the operating voltage source is arranged in the region of the control device. It is particularly preferred if the first core is connected to a connector via a pull-up resistor, said connector being coupled to an operating voltage potential of the control device. In another variant, the operating voltage source is a current source, which is capable of feeding a defined, load-independent current into the two-wire line.

This refinement is particularly advantageous in combination with the preceding refinement. However, it can also be implemented separately therefrom. The particular feature of this refinement consists in that the first core conducts both the input signal for the control device (from the signaling device to the control device) and provides an operating voltage in the reverse direction for the signaling device. The first core therefore performs a dual function. This enables a particularly simple and inexpensive embodiment if the signaling device and the control device are arranged far away from one another. Furthermore, this refinement per se has the advantage that the signaling device can be supplied with an operating voltage in a simple manner, especially if an electrical connection to earth provides the reference potential. A current source also enables quicker charge reversal of the two-wire line and therefore an increased reaction speed of the novel safety circuit arrangement.

In a further refinement, the signaling device has a voltage regulator, which generates a largely constant operating voltage for the pulse generator using the predominantly constant voltage between the first and second cores.

This refinement contributes to ensuring stable and uninterrupted operation of the signaling device, even if the first core is used in the above-described dual function, i.e. firstly for transmitting the defined pulsed signal and secondly for supplying an operating voltage to the signaling device. On account of the pulsed signal, the voltage between the first and second cores repeatedly dips as a result of the design. A voltage regulator is capable of compensating for these voltage dips so well that stable operation of the signaling device is possible even when the signal generator is implemented with the aid of a microcontroller or another component which is sensitive to voltage dips.

In a further refinement, the signal generator has a signal processing circuit and a switching element, which is driven by the signal processing circuit and is arranged between the first and second cores. In preferred exemplary embodiments, the signal processing circuit is a microcontroller, a microprocessor, an ASIC or an FPGA, i.e. a programmable signal processing circuit.

In this refinement, the switching element which enables the short circuit between the first and second cores is separate from the signal processing circuit which preferably determines the respective present state of the actuator. The refinement makes it possible to effect the short circuit with a switching element that has optimum characteristics so as to absorb the currents and thermal loads during the short circuit. The refinement therefore contributes to a long life and high degree of operational reliability of the novel signaling device and the novel safety circuit arrangement. Secondly, a programmable signal processing circuit provides a high degree of flexibility in terms of selection and generation of the defined pulsed signal. It is easily possible to generate "complicated" pulsed signals with a defined sequence of relatively long and relatively short signal pulses. The more unique and complex the defined pulsed signal is the more individual and safe the evaluation of the information from the signaling device by the control device can be.

In a further refinement, the signaling device has a first and a second pulse generator, which are connected in parallel with one another to the first and second cores.

In this refinement, the signaling device has at least two redundant pulse generators. In preferred exemplary embodiments, each of the two pulse generators is capable of generating a defined pulsed signal. The redundancy firstly enables an advantageous two-channel embodiment and therefore provides increased failsafety. Furthermore, the redundancy also increases availability, with the result that the novel signaling device can transmit a pulsed signal to the control device for diagnosis purposes, for example, even when one of the signal generators fails.

In a further refinement, the first and second pulse generators together generate the defined pulsed signal. In preferred exemplary embodiments, each of the two pulse generators generates some of the signal pulses, wherein only the combination of the signal pulses generated by the pulse generators forms the defined pulsed signal which corresponds to the expectations in the control device. In some variants, the first pulse generator has a master function with respect to the second pulse generator by virtue of the second pulse generator only generating signal pulses in accordance with a defined pattern when it has detected a number of signal pulses of the first pulse generator on the first core. Correspondingly, it is also preferred if each pulse generator has a readback input, via which it can read signal pulses on the lines leading to the control device.

The refinement enables very simple generation of a "two-channel" pulsed signal with the aid of two redundant pulse generators. The novel signaling device can therefore also be embodied in a very inexpensive manner in the two-channel variant. A readback input at the pulse generator furthermore enables simpler diagnosis of fault states, for which reason this variant can also be advantageous in single-channel signaling devices.

In a further refinement, the signaling device has a largely closed device housing, in which the actuator and the pulse generator are arranged. In preferred exemplary embodiments, the actuator is a mechanically moved actuator, in particular a manually actuated actuating element.

In this refinement, the essential components of the novel signaling device are encapsulated in a device housing. In particular, at least the electrical connection of the actuator and the pulse generator are arranged in the device housing. The refinement has the advantage that the actuator cannot be isolated from the pulse generator by unintentional faulty operation, with the result that the defined pulsed signal of the pulse generator as a result of a cross connection or the like does not represent the actual state of the actuator. The refinement therefore provides increased failsafety.

In a further refinement, the control device is designed to determine a fault state of the signaling device on the basis of the defined pulsed signal. In preferred variants, the control device is further designed to indicate the fault state, for example on a display unit arranged in the control device and/or with the aid of a diagnosis signal provided at a diagnosis output.

In this refinement, the failsafety of the signaling device is "made" in the control device, i.e. the decision as to whether a fault state is present or not and the response to a possible fault of the signaling device takes place in the control device. The pulsed signal is therefore per se not necessarily a "safe" signal. Only the interpretation of the pulsed signal in the control device, in particular the comparison with the expectations stored in the control device, makes it possible to say whether there is a fault. The refinement enables a very inexpensive implementation since fault detection mechanisms are required in the control device in any case. The signaling device can have a simpler and therefore less expensive embodiment.

It goes without saying that the features mentioned above and yet to be explained below can be used not only in the respectively cited combination, but also in other combinations or on their own without departing from the scope of the present invention.

BRIEF DESCRIPTION OF THE DRAWINGS

Exemplary embodiments of the invention are illustrated in the drawing and will be explained in more detail in the description below. In the drawing.

DESCRIPTION OF PREFERRED EMBODIMENTS

Figure 1:
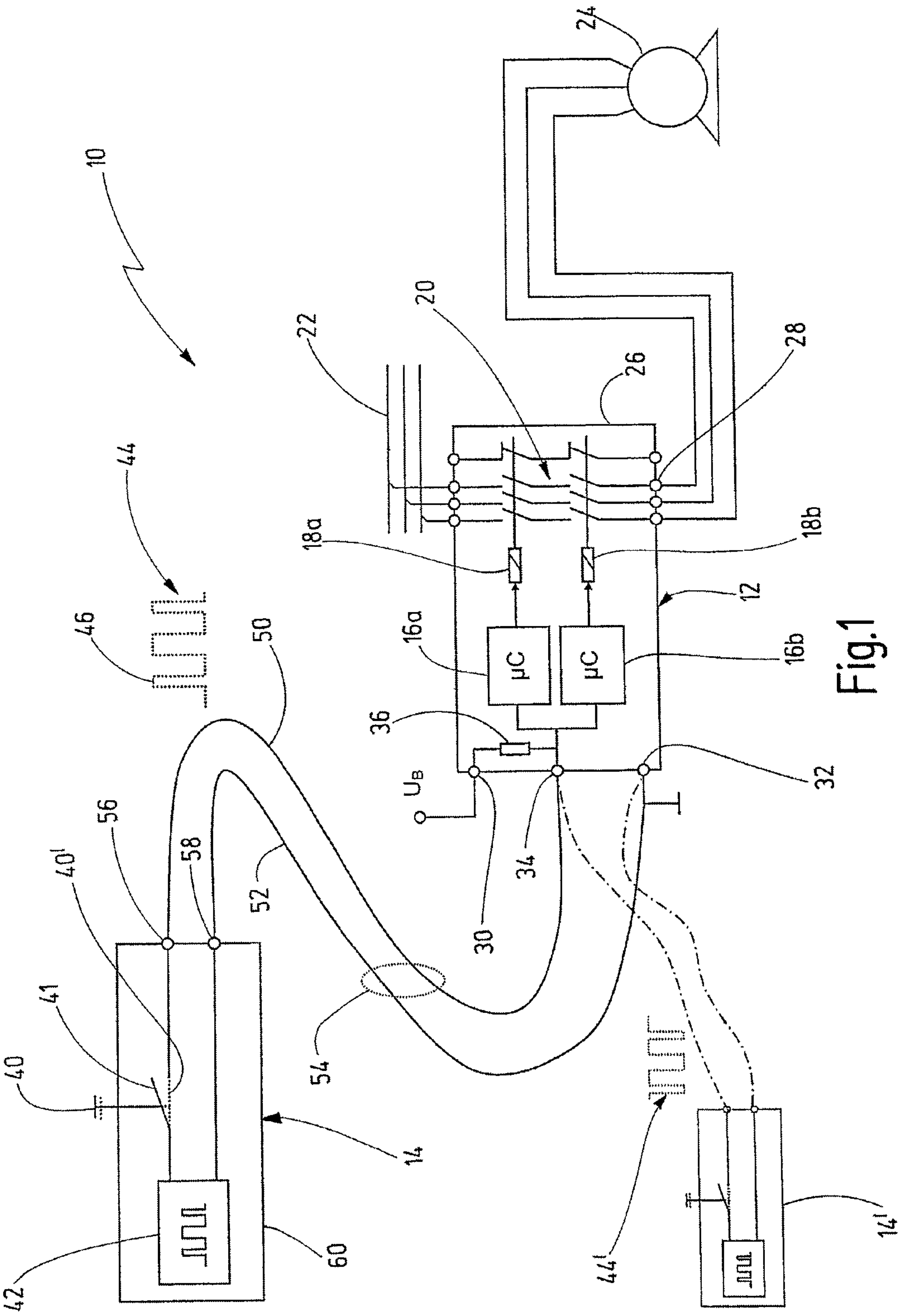
FIG. 1 shows a simplified illustration of an exemplary embodiment of the novel safety circuit arrangement.

In FIG. 1, an exemplary embodiment of the novel safety circuit arrangement is denoted by the reference numeral 10 in its entirety. The safety circuit arrangement 10 comprises a control device 12 and a signaling device 14. In this exemplary embodiment, the control device 12 is a safety switching device with a largely fixed functional range. Suitable safety switching devices are offered for sale by the applicant under the brand name PNOZ®. The safety switching device 12 is designed to process input signals from signaling devices in order to connect or disconnect an actuator, such as a contactor, a solenoid valve or an electric drive, for example, depending on said input signals. As an alternative to a safety switching device, the control device 12 could be a programmable safety controller, as is offered for sale by the applicant under the brand name PSS® in different variants.

The control device 12 has multiple-channel redundancy and includes test functions which are designed for detecting internal component part failure and external faults in the circuitry in order to bring a monitored installation into a safe state in the event of a fault. In the preferred exemplary embodiments, the control device 12 is failsafe in terms of European Standard EN 954-1, category 3 or higher, in terms of SIL2 in accordance with International Standard IEC 61508 or in terms of comparable specifications. In this case, two redundant signal processing channels in the form of two microcontrollers 16*a*, 16*b*, which each drive a switching element 18*a*, 18*b*, are illustrated in simplified form. Instead of microcontrollers, the control device 12 could have microprocessors, ASICs, FPGAs or other signal and data processing circuits.

The switching elements 18 are in this case illustrated as relays, whose working contacts are arranged in series with one another. The working contacts form a power supply path 20 between a power supply 22 and an electric drive 24, which represents a machine installation in this case. It goes without saying that the machine installation in real cases can include a plurality of electric drives and other actuators. The invention is not limited to machine installations in the narrower sense of production machines. It can be used in all technical installations which pose a risk during operation and need to be brought into a safe state in such a case, in particular by interruption of a power supply path 20. Instead of or in addition to the relay 18, the control device 12 can have electronic switching elements, in particular power transistors. In some exemplary embodiments, the control device 12 has, on the output side, a plurality of redundant electronic switching elements, which each provide an output signal with reference to a defined potential and with which external contactors, solenoid valves or the like can be driven.

In the preferred exemplary embodiments, the control device 12 has a device housing 26, in which the individual components, in particular the processors 16 and switching elements 18, are arranged. Connectors are arranged at the device housing, some of said connectors being denoted here by reference numerals 28, 30, 32 and 34.

Connector 30 is in the present case a connector for supplying an operating voltage UB for the control device 12. In some exemplary embodiments, the operating voltage UB is a 24 volt DC voltage, which is required for supplying the processors 16, switching elements 18 and further components of the control device 12. Connector 32 is in this case a ground connector, which is the reference potential for the supply voltage UB. Connector 32 is therefore the device ground potential of control device 12 in this case.

The connector 34 is a signal input of the control device 12. An input signal applied to connector 34 is supplied in redundant fashion to the microcontrollers 16 and is evaluated in redundant fashion by the microcontrollers 16 in order to drive the switching elements 18 depending on said signal. In accordance with a preferred exemplary embodiment, the control device 12 in this case has a pull-up resistor 36, which connects connector 34 to the operating voltage UB at the connector 30. The potential at connector 34 is therefore “pulled up” to the potential of the operating voltage UB, which is a particularly preferred embodiment in connection with the signaling device explained below. In some exemplary embodiments, the pull-up resistor 36 can be integrated in the connectors 30, 34. In other exemplary embodiments, the pull-up resistor 36 can be arranged outside the control device 12.

The signaling device 14 has an actuator 40, which is in this case a manually actuated button. The actuator 40 is biased into a first operating position via a spring (not illustrated here), with an electrical contact 41 being open in said first operating position. In the present exemplary embodiment, this is the inactive rest state (second state) of the actuator 40. The actuator 40 can be brought into a second operating position 40', in which the contact 41 is closed, counter to the spring force. When contact 41 is closed, a pulse generator 42 is connected to the operating voltage UB. The pulse generator 42 then generates a defined pulsed signal 44 with a plurality of signal pulses 46. Consequently, the state 40' is a defined first state in terms of the present invention. In one exemplary embodiment, the pulse generator 42 only receives the operating voltage required for generating the signal pulses 46 when the actuator 40 is activated. Otherwise, it is dead. In all of the presently preferred exemplary embodiments, the pulse generator 42 generates the pulsed signal 44 only when the actuator 40 is in the defined first state 40'.

In the exemplary embodiment illustrated, the actuator is a simple manually actuated normally open contact. In other exemplary embodiments, the actuator can be a normally closed contact or a combination of normally closed and normally open contacts. Furthermore, the actuator can be a transponder, a light barrier or a measured-value transducer for temperature, pressure, voltage etc. In a preferred exemplary embodiment, the signaling device 14 is used for safely connecting drive 24 for test and setup purposes. The signaling device 14 can in this case be arranged at a great distance from the drive 24 and the control device 12. In one exemplary embodiment, the control device 12 is arranged in a switchgear cabinet in the vicinity of the drive 24, while the signaling device 14 is at a distance of several hundred meters from the switchgear cabinet. In other exemplary embodiments, the signaling device 14 can be in the form of an emergency stop button, a protective door switch, a proximity switch, a light barrier, a temperature monitor or the like.

The signaling device 14 is in this case connected to the control device 12 via two line cores 50, 52 of a two-wire line 54. The first line core 50 leads from a connector 56 of the signaling device to the connector 34 of the control device. The second line core 52 leads from a connector 58 of the signaling device to the connector 32. The connectors 56, 58 are arranged on a device housing 60, which surrounds the pulse generator 42 and the actuator 40 (as far as possible).

One characteristic of the novel safety circuit arrangement 10 is the ability of the signaling device 14 to generate, purely depending on the actuation of the actuator 40, a defined “dedicated” pulsed signal 44, which is supplied to the control device 12 via the two-wire line 54. In contrast to known safety circuit arrangements, the signaling device 14 in the preferred exemplary embodiments does not receive an enable or request signal from the control device 12. Instead, it generates the pulsed signal 44 automatically as soon as the actuator 40 is located in the defined first state 40'. The defined pulsed signal 44 is stored as an expectation in the control device 12 (more precisely in a memory which is contained in the microcontrollers 16, for example). As soon as the microcontrollers 16 identify the defined pulsed signal 44 at signal input 34, this is interpreted as actuation of the actuator 40. In the exemplary embodiment illustrated, the microcontrollers 16 then connect the drive 24 via the switching elements 18.

When the signaling device 14 is intended to act as an emergency stop button, on the other hand, the rest state of the actuator 40 is preferably selected such that the pulse generator 42 continuously generates the pulsed signal 44 and interrupts the pulsed signal 44 upon actuation of the emergency stop button. The microcontrollers 16 identify the absence of pulsed signal 44 and disconnect the drive 24 correspondingly.

As is illustrated in FIG. 1, the safety circuit arrangement 10 can comprise further signaling devices 14', which are connected in parallel with the signaling device 14 to the connectors 32, 34. Preferably, a further signaling device 14' generates a different defined pulsed signal 44', which differs from the pulsed signal 44. The control device 12 can then identify, on the basis of the pulsed signals, the signaling device from which a pulsed signal present at the input 34 originates.

Figure 2:
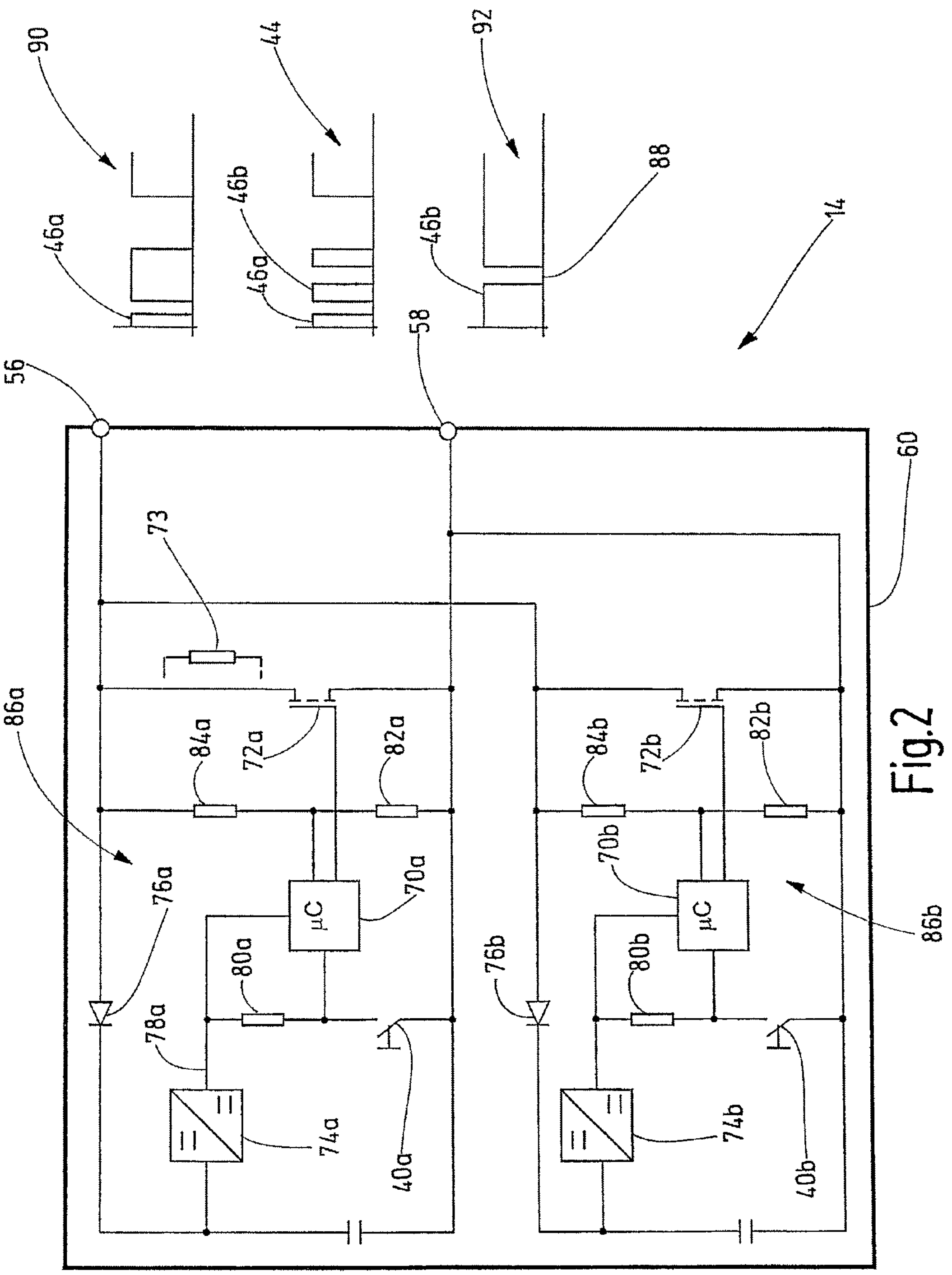
FIG. 2 shows a simplified illustration of an exemplary embodiment of the novel signaling device used in the safety circuit arrangement shown in FIG. 1.

FIG. 2 shows a further exemplary embodiment of the novel signaling device. Identical reference symbols denote the same elements as before.

In this exemplary embodiment, the signaling device 14 has a microcontroller **70*a* and a switching element 72*a*, which is driven by the microcontroller 70*a*. The switching element 72*a* is in this case a field effect transistor (FET), whose source and drain terminals are arranged between the connectors 56, 58. The FET is thus capable of effecting a short circuit between the line cores 50, 52 of the two-wire line 54. Instead of a FET, a bipolar transistor can be arranged with its collector and emitter terminals between the connectors 56, 58. In a modified exemplary embodiment, an electrical resistor 73, which forms a voltage divider together with the pull-up resistor 36 in the control device, can be arranged between the switching element and one of the two connectors 56, 58. Such a resistor has the effect that the voltage between the two line cores 50, 52 is not reduced to zero in the event of a voltage dip generated by the signaling device but is reduced to a voltage value which corresponds to the divider ratio of the voltage divider 36, 73. This variant has the advantage that the operating voltage for the signaling device does not completely break away when the signal pulses 46** are generated.

Reference numeral 74*a* denotes a voltage regulator (DC-DC converter), which receives the voltage present at the connector 56 via a diode 76*a*. At its output 78*a*, the voltage regulator generates a regulated DC voltage of 5 volts, for example, which serves as the operating voltage for the microcontroller 70*a*. The voltage regulator 74*a* in particular compensates for those voltage dips on the line core 50 which result from the generation of the pulsed signal 44. Furthermore, the voltage regulator 74 also compensates for other voltage fluctuations, including those caused by the signaling device 14', for example.

Reference numeral 40*a* in this case denotes the normally open contact of the actuator 40. The contact 40*a* in this case forms a (further) voltage divider together with a resistor 80*a*, with an input of microcontroller 70*a* being connected to the center tap of said voltage divider. The microcontroller 70*a* can thus read the actuation state of the actuator 40 and, depending on this, generate the pulsed signal 44 by causing a short circuit between the line cores 50, 52 with the aid of the switching element 72*a*.

Reference numerals 82*a*, 84*a* denote two further resistors, which form a second voltage divider arranged in parallel with connectors 56, 58. A center tap of the voltage divider 82*a*, 84*a* is connected to another input of microcontroller 70*a*. The microcontroller 70*a* can read back the signal pulses 46 with the aid of the voltage divider 82*a*, 84*a*.

In some exemplary embodiments, the signaling device 14 has a single-channel design. In preferred exemplary embodiments, however, the signaling device 14 has a redundant second channel, which in this case is denoted overall by reference numeral 86*b*. In the exemplary embodiment illustrated, the channel 86*b* has the same configuration as the first channel 86*a* described, i.e. it has a microcontroller 70*b*, a switching element 72*b* and a voltage regulator 74*b*. The switching element 72*b* is connected in parallel with the switching element 72*a* between the connectors 56, 58, with the result that the microcontroller 70*b* can generate a voltage dip between the line cores 50, 52 as well.

In a preferred exemplary embodiment, the two microcontrollers 70*a*, 70*b* generate the defined pulsed signal 44 jointly as soon as the actuator 40 is in its activated state. For example, the microcontroller 70*a* first generates a first signal pulse 46*a* by bringing the switching element 72*a* into the on-state for a defined time span (pulse duration). The microcontroller 70*b* can read the signal pulse 46*a* via the voltage divider 82*b*, 84*b* and, after a delay time set in the microcontroller 70*b*, it generates a second signal pulse 46*b* by now bringing switching element 72*b* into the on-state. The resultant short circuit is shown in FIG. 2 at reference numeral 88. The microcontrollers 70*a*, 70*b* then generate signal pulses 46*a*, 46*b* in a defined sequence by respectively short-circuiting the line cores 50, 52, which then results in the defined pulsed signal 44. FIG. 2 shows the pulsed signal 44, which results from the combination of the signal pulses 90 of the first channel 86*a* and the signal pulses 92 of the second channel 86*b*.

In further exemplary embodiments, the second channel 86*b* can include a switching element 72*b*, which is arranged in series with the switching element 72*a* between the connectors 56, 58. Furthermore, the two channels 86*a*, 86*b* can be combined via an AND element (not illustrated here). The AND element then preferably drives the switching element 72*a*. The variant illustrated in FIG. 2 has the advantage over this that each microcontroller 70*a*, 70*b* can generate a defined pulsed signal independently of the respective other channel. This can be advantageously used in the control device 12 for determining which of the two channels 86*a*, 86*b* is the cause of a faulty pulsed signal.

What is claimed is:

1. A safety circuit arrangement for connection or failsafe disconnection of a hazardous installation, comprising:
- a control device designed to connect or failsafely interrupt a power supply path to the installation, and
- a signaling device connected to the control device via a two-wire line having a first and a second core,
- with the signaling device having an actuator configured to be moveable between a defined first state and a second state, and having a pulse generator designed to generate a defined pulsed signal with a plurality of signal pulses on the two-wire line when the actuator is in the defined first state,
- wherein a substantially constant voltage is present between the first and second core when the actuator is in the second state, and
- wherein the pulse generator is designed to effect a voltage dip between the first core and the second core in order to generate the plurality of signal pulses.

2. The safety circuit arrangement of claim 1, wherein the control device has a signal input connector, which is electrically connected to the first core, and a ground connector, which is electrically connected to the second core.

3. The safety circuit arrangement of claim 1, wherein the first core is further connected to an operating voltage source, which is arranged remote from the signaling device.

4. The safety circuit arrangement of claim 1, wherein the signaling device has a voltage regulator, which generates a constant operating voltage for the pulse generator using the substantially constant voltage between the first and second cores.

5. The safety circuit arrangement of claim 1, wherein the pulse generator has a signal processing circuit and a switching element, which is driven by the signal processing circuit and is arranged between the first and second cores.

6. The safety circuit arrangement of claim 1, wherein the signaling device has a first and a second pulse generator, which are connected in parallel with one another to the first and second cores.

7. The safety circuit arrangement of claim 6, wherein the first and second pulse generators together generate the defined pulsed signal.

8. The safety circuit arrangement of claim 1, wherein the signaling device has a substantially closed device housing, in which the actuator and the pulse generator are arranged.

9. The safety circuit arrangement of claim 1, wherein the control device is designed to determine a fault state of the signaling device on the basis of the defined pulsed signal.

10. In a safety circuit arrangement comprising a safety controller configured for connection or failsafe disconnection of a hazardous installation, a signaling device comprising:
- a first and a second connector for connecting a two-wire line leading to the safety controller, said two-wire line having a first core and a second core,
- an actuator moveable between a defined first state and a second state,
- a voltage regulator designed for generating a constant operating voltage from a supply voltage provided on the first and second cores, and a pulse generator designed to generate a defined pulsed signal with a plurality of signal pulses between the first core and the second core when the actuator is in the defined first state, wherein the pulse generator receives the constant operating voltage from the voltage regulator, and wherein the pulse generator is designed to effect a short circuit between the first core and the second core in order to generate the plurality of signal pulses.

11. The signaling device of claim 10, wherein the pulse generator comprises a signal processing circuit and a switching element driven by the signal processing circuit, said switching element being arranged between the first and second cores.

12. The signaling device of claim 10, wherein the signaling device has a first and a second pulse generator, which are connected in parallel with one another to the first and second cores.

13. The signaling device of claim 12, wherein the first and second pulse generators together generate the defined pulsed signal by alternatingly effecting the short circuit between the first core and the second core.

14. The signaling device of claim 10, further comprising a substantially closed device housing, in which the actuator and the pulse generator are arranged.

* * * * *